United States Patent
Berg et al.

(10) Patent No.: US 9,707,656 B2
(45) Date of Patent: Jul. 18, 2017

(54) AUTOMATED INSPECTION SYSTEM

(71) Applicant: The Boeing Company, Hungtington Beach, CA (US)

(72) Inventors: Frederic P. Berg, Seattle, WA (US); Mark F. Gabriel, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 431 days.

(21) Appl. No.: 14/529,350

(22) Filed: Oct. 31, 2014

(65) Prior Publication Data

US 2015/0056030 A1    Feb. 26, 2015

Related U.S. Application Data

(62) Division of application No. 13/777,000, filed on Feb. 26, 2013, now Pat. No. 8,881,611.

(51) Int. Cl.
| | |
|---|---|
| B23B 49/04 | (2006.01) |
| B23Q 17/20 | (2006.01) |
| B23B 49/00 | (2006.01) |
| G01B 7/00 | (2006.01) |

(52) U.S. Cl.
CPC .............. B23Q 17/20 (2013.01); B23B 49/00 (2013.01); G01B 7/00 (2013.01); B23B 2270/32 (2013.01); B23B 2270/48 (2013.01); Y10S 901/41 (2013.01); Y10S 901/44 (2013.01); Y10T 408/05 (2015.01)

(58) Field of Classification Search
None
See application file for complete search history.

(56) References Cited

U.S. PATENT DOCUMENTS

| | | |
|---|---|---|
| 3,133,457 A | 5/1964 | Martens |
| 4,753,555 A | 6/1988 | Thompson et al. |
| 5,293,131 A | 3/1994 | Semones et al. |
| 5,313,410 A | 5/1994 | Watts |
| 7,685,726 B2 | 3/2010 | Fuchs et al. |
| 2009/0255139 A1 | 10/2009 | Wallace et al. |

(Continued)

FOREIGN PATENT DOCUMENTS

| | | | |
|---|---|---|---|
| JP | 3-216501 | * | 9/1991 |
| WO | WO2012154319 | | 11/2012 |

OTHER PUBLICATIONS

US Patent and Trademark Office; Office Action for U.S. Appl. No. 13/777,000 dtd Jan. 30, 2014.

(Continued)

*Primary Examiner* — Robert R Raevis
(74) *Attorney, Agent, or Firm* — Parsons Behle & Latimer

(57) ABSTRACT

A drilling system includes a drilling machine, configured to drill a hole in a work piece along a drilling axis, a deployment mechanism, attached to the drilling machine, a measuring probe, attached to the deployment mechanism, and a controller, coupled to the drilling machine, the measuring probe, and the deployment mechanism. The measuring probe is configured to produce a signal indicative of an actual geometric parameter of the hole when inserted therein. The deployment mechanism is configured to selectively align the measuring probe along the drilling axis. The controller is configured to cause insertion of the measuring probe into the hole, and to receive the signal from the measuring probe.

18 Claims, 9 Drawing Sheets

(56) References Cited

U.S. PATENT DOCUMENTS

2010/0300713 A1 12/2010 Kume et al.
2010/0319207 A1 12/2010 Held
2011/0000274 A1 1/2011 Fujimura
2011/0110737 A1 5/2011 Hiraga et al.

OTHER PUBLICATIONS

US Patent and Trademark Office; Final Office Action for U.S. Appl. No. 13/777,000 dtd May 1, 2014.
Patent Cooperation Treaty, International Search Report and Written Opinion for PCT/US2014/012900 dated Apr. 15, 2014.

* cited by examiner

AUTOMATED INSPECTION SYSTEM

PRIORITY CLAIM

The present application is a divisional of U.S. patent application Ser. No. 13/777,000, filed on Feb. 26, 2013 and entitled "Automated Inspection System," the disclosure of which is incorporated herein by reference in its entirety.

BACKGROUND

In the field of manufacturing, frequent measurement and inspection are undertaken to ensure that manufactured parts conform to design specifications. This includes the inspection of holes, such as drilled holes, to ensure that the holes are of the desired shape and configuration, e.g. diameter and alignment, within engineering tolerances. Ensuring conformance of production parts to design specifications is of particular concern in industries such as aerospace manufacturing, where exacting production standards are maintained.

There are many conditions that can produce drilled holes that are out of specification. One common out-of-spec problem for drilled holes is the production of a hole that is oversized. Drill bits can also deflect while drilling, causing holes to be out of profile. Tools that malfunction or are not properly calibrated or adjusted can suffer from chatter, vibration or other problems, which can produce oversized, out-of-round, deflected (e.g. deflected from the drilling axis) or otherwise defective holes. Similarly, dull or damaged bits can produce defective holes. In this regard, robotic or computer numerically controlled ("CNC" or "N/C") drilling equipment can suffer these and other types of malfunctions that can result in holes that are outside of design tolerances.

To ensure compliance of drilled holes with their design specifications, it has generally been the practice either to have a quality control or quality assurance ("QA") inspector examine each hole, or to use statistical techniques to analyze a sampled number of holes. Inspection may be performed by manually inserting a hole diameter probe, such as a capacitance-based probe, an air pressure hole probe, a laser hole probe, or a ball-type probe, into a hole to check its compliance with or variation from design specifications. Unfortunately, this process is relatively expensive and time-consuming, and is also dependent upon the skill and training of the inspector.

SUMMARY

The present disclosure seeks to address one or more of the above issues.

Advantageously, the inspection system disclosed herein automatically accesses a hole after being formed and measures the diameter of each hole at several locations along its axis to determine whether the hole is within the diameter and profile specification, and then communicates to the process controller whether the hole is within or outside of specification. The method and system according to the present disclosure may be used to inspect multiple holes and may self-calibrate with one or more onboard certified ring gages. Compared with known systems and methods, the system and method according to the present disclosure reduce process time, and promotes more consistent results during fabrication. The disclosed method and system eliminate the need for manually inspecting each hole to determine whether the drilled hole is within the specified tolerances, thus helping to reduce costs while improving quality. It has been recognized that it would be advantageous to develop an automated system for inspecting the diameter and/or profile of drilled holes.

It has also been recognized that it would be advantageous to have an automatic system for inspecting holes that is rapid and consistent.

It has also been recognized that it would be advantageous to have an automatic system for inspecting holes of differing diameters.

It has also been recognized that it would be advantageous to have an automatic system for inspecting the diameter and/or profile of drilled holes that is compatible with robotic and N/C drilling equipment. In accordance with one aspect thereof, the present disclosure relates to a system for inspecting an aperture having an axis, a design geometric parameter, a first actual geometric parameter, and a depth. The system includes a first measuring probe configured to produce a signal indicative of the first actual geometric parameter of the aperture when inserted therein; a deployment mechanism supporting the first measuring probe and attachable to a robotic device, the deployment mechanism configured to selectively orient the first measuring probe along the axis of the aperture; and a controller, couplable to the robotic device, the first measuring probe, and the deployment mechanism. The controller is configured to cause insertion of the first measuring probe into the aperture substantially along the axis and to receive the signal from the probe.

In accordance with another aspect thereof, the disclosure relates to a drilling system. The system includes a drilling machine, configured to drill a hole in a work piece along a drilling axis; an automatic deployment mechanism, attached to the drilling machine; a capacitance-type probe, attached to the deployment mechanism and configured to produce a signal indicative of an actual geometric parameter of the hole when inserted therein, the deployment mechanism being configured to selectively align the capacitance-type probe substantially along the drilling axis; and a controller, coupled to the drilling machine, the capacitance-type probe, and the deployment mechanism. The controller is configured to cause insertion of the capacitance-type probe into the hole, and to receive the signal from the capacitance-type probe.

In accordance with yet another aspect thereof, the disclosure relates to a method for inspecting an aperture. The method includes placing a first probe substantially along an axis of a first aperture via a first automatic deployment mechanism associated with a robotic device; inserting the first probe into the first aperture and removing the first probe therefrom by automatically moving the robotic device along the axis of the first aperture, wherein the first aperture has a design geometric parameter, an actual geometric parameter, and a depth; and receiving a measurement signal corresponding to the actual geometric parameter of the first aperture from the first probe. The measurement signal is generated at one or more positions relative to the depth of the first aperture during at least one of inserting and removing the first probe.

BRIEF DESCRIPTION OF THE DRAWINGS

Additional features and advantages of the invention will be apparent from the detailed description which follows, taken in conjunction with the accompanying drawings, which together illustrate, by way of example, features of the invention, and wherein.

DETAILED DESCRIPTION

Figure 1:
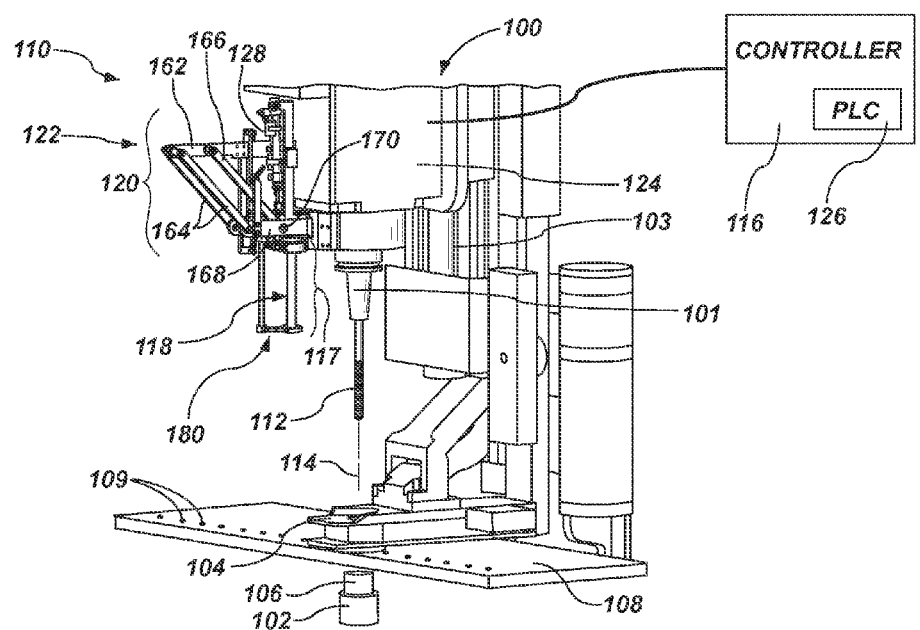
FIG. 1 is a perspective view of an example of a robotic drilling machine having an automatic hole inspection system in accordance with the present disclosure, showing the probe and self-calibration system in a retracted or stowed position.

Reference will now be made to examples illustrated in the drawings, and specific language will be used herein to describe the same. It will nevertheless be understood that no limitation of the scope of the disclosure is thereby intended. Alterations and further modifications of the inventive features illustrated herein, and additional applications of the principles of the various aspects of the disclosure, as illustrated herein, which would occur to one skilled in the relevant art and having possession of this disclosure, are to be considered within the scope of the disclosure.

As used herein, positional and directional terms, such as "front," "back," "top," "bottom," "above," "below," "in," "out," "up," "down," and the like, are to be interpreted relative to the respective illustrations in the drawings. These terms are used for the purpose of description in connection with the drawings only, and do not necessarily indicate a specific direction, position or orientation relative to any other thing or any other positional or directional reference system, unless otherwise indicated. Those of skill in the art will recognize that the apparatus described herein may be used in a variety of orientations in which positional and directional terms could be used differently.

Figure 2:
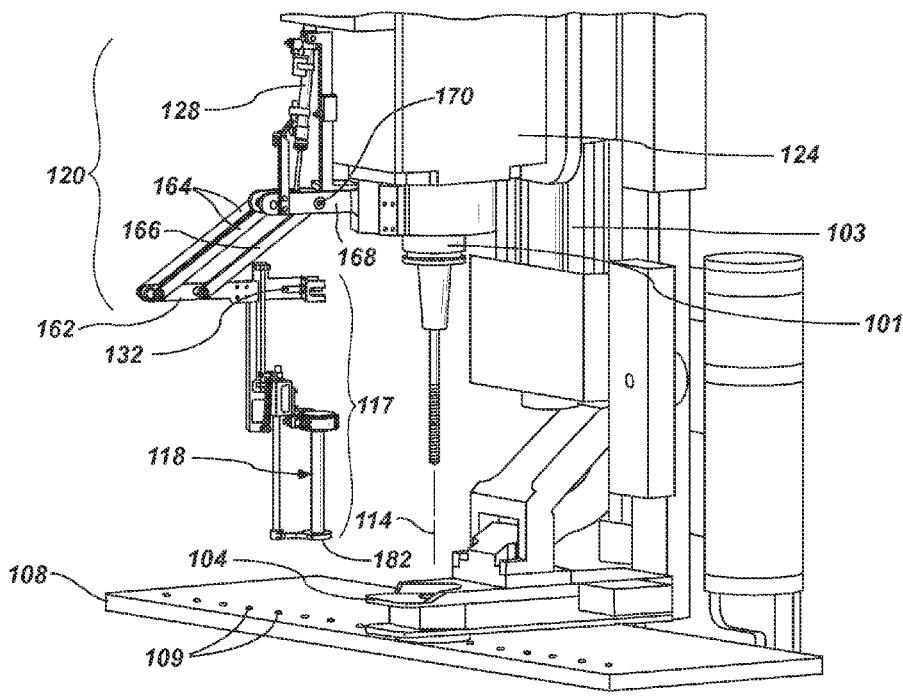
FIG. 2 is a perspective view of the automatic hole inspection system of FIG. 1, showing the probe and self-calibration system in a partially deployed position.
Figure 3:
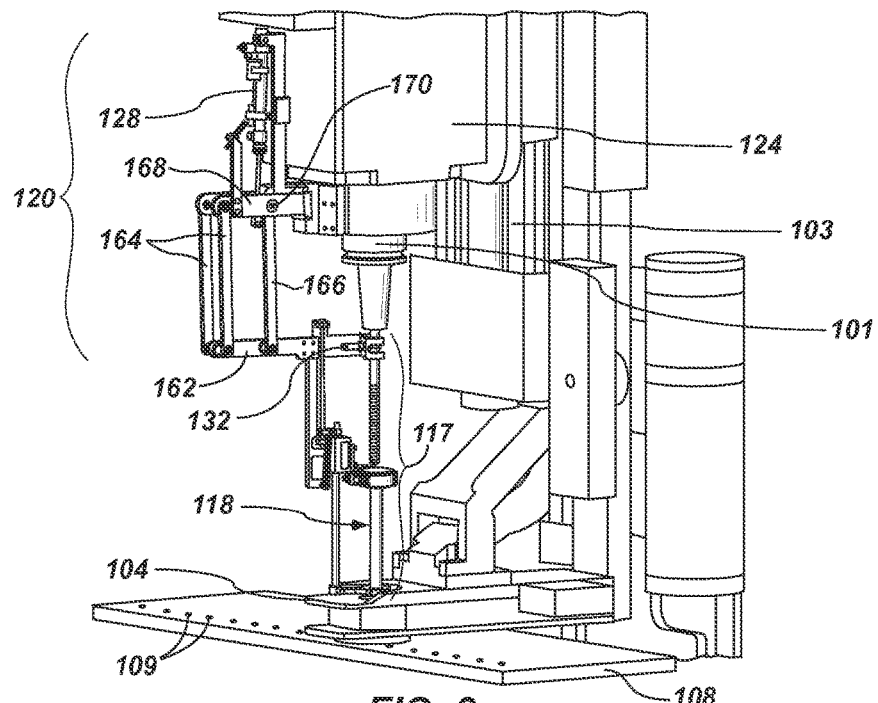
FIG. 3 is a perspective view of the automatic hole inspection system of FIGS. 1 and 2, showing the probe and self-calibration system in the fully deployed position.

Advantageously, a multiple-hole automated inspection system and method have been developed to promote the speed and efficiency of inspecting holes. Shown in FIGS. 1-3 are perspective views of an exemplary robotic device 100, provided with an automated inspection system 110 for holes (apertures) 109 in accordance with an aspect of the present disclosure. The robotic device 100 can be a robotic or N/C drilling machine, for example, though it is to be understood that the multiple-hole automated inspection system 110 disclosed herein can be associated with other types of equipment, such as flex-track machines, crawlers, automatic machines such as riveting machines, milling machines, etc. The drilling machine 100 has a drill bit 112 that is aligned along a drilling axis 114, and is configured to drill at least one hole or aperture 109 in a part or work piece 108.

The robotic device or drilling machine 100, shown in FIG. 1, generally includes a drilling spindle 124, which retains a drill holder 101 that carries the drill bit 112. The drilling spindle 124 is mounted to a slide 103 that allows the drilling spindle to move vertically to drill holes in the work piece 108, which may be clamped between a clamp foot 102 and a pressure plate 104. Actuation devices that provide automated motion of the drilling spindle 124 are not specifically shown in the figures, but are well understood by those of skill in the art. A pressure plate 104 is associated with the slide 103 and serves to support the work piece 108 from the top during drilling of the holes or apertures 109. The pressure plate can also include an air cooling system (not shown) for the drill bit 112. The clamp foot 102 also includes a nose-clamp support 106 that underlies and supports the work piece 108 from the bottom during drilling.

In the example shown in FIGS. 1-3, the hole inspection system 110 generally includes three major components: a controller 116, a probe assembly 117, and a probe deployment system 120. The probe assembly 117 can also include a self-calibration system 180, discussed in more detail below. The hole inspection system 110 is attachable to the drilling spindle 124, and is configured to selectively orient a probe 118 along the drilling axis 114. The inspection system can be configured as an add-on component to the robotic device 100, or it can be original equipment that is an integral part of the robotic device 100.

The controller 116 is operatively coupled to the drilling machine 100, the probe assembly 117, and the probe-deployment system 120, and is configured to selectively cause insertion of the measuring probe 118 into the hole or holes 109 or withdrawal of the measuring probe 118 from the hole or holes 109, substantially along the drilling axis 114. In one embodiment, the controller is a model 750-808 controller made by WAGO Corporation of Germantown, Wis. Other controllers can also be used, such as those made by Allen-Bradley and Rockwell Automation. The measuring probe 118 is configured to produce a signal indicative of the diameter of a hole 109 when inserted therein, and the deployment system 120 supports and positions the measuring probe 118. While the controller 116 is only shown in FIG. 1, it is to be understood that the controller 116 is presumed to be associated with the structure shown in the other figures. It is also to be appreciated that while the controller 116 shown in FIG. 1 is depicted as a single controller that controls both the robotic device 100 and the hole-inspection system 110, separate controllers can be provided for the different devices, and these can be interconnected for coordinated operation.

As illustrated in FIGS. 1-3, the probe-deployment system 120 of the hole inspection system 110 generally includes a deployment mechanism 122, and an actuator, such as a pneumatic cylinder 128. The deployment mechanism 122 is automatic and has a stowed or retracted position, shown in FIG. 1, in which the probe assembly 117 is positioned up and away from the drilling axis 114, and an extended or deployed position, shown in FIG. 3, in which the probe assembly 117 is located between the drill bit and the hole in the work piece (not shown) with the probe 118 substantially axially aligned with the drilling axis 114. FIG. 2 shows the deployment mechanism 122 partially deployed.

The deployment mechanism 122 can include a mechanical arm device, such as a four-bar linkage, configured to move the probe assembly 117 via translation, i.e. such that the longitudinal axis of the probe 118 does not rotate as the probe is transposed between the stowed and extended positions. The four bar linkage can be a parallel arm device that includes a horizontal arm 162, a pair of outer parallel arms 164, and a driving arm 166. The probe assembly 117 is fixedly attached to and extends downwardly from the horizontal arm 162. The outer parallel arms 164 and the driving arm 166 are pivotally attached at their first ends to a mounting bar 168, which is fixedly attached to and extends outwardly from the spindle 124. The horizontal arm 162 is pivotally attached to the second, opposite ends of the outer parallel arms 164 and the driving arm 166. The driving arm 166 can be generally parallel to and the same length as the outer parallel arms 164, and is coupled to a pneumatic cylinder 128, which serves as an actuator for the four bar linkage.

The pneumatic cylinder 128 moves the four-bar linkage from the stowed or retracted position, shown in FIG. 1, to the deployed or extended position, shown in FIG. 3, by pushing or pulling on the driving arm 166. The pneumatic cylinder 128 is attached to the driving arm 166 near, but spaced some distance away from, the driving arm's pivotal point 170 on the mounting bar 168. When this cylinder extends, it rotates the driving arm 166 counter-clockwise (in the views of FIGS. 1-3) about its pivot point 170, which causes simultaneous counter-clockwise rotation of the outer parallel arms 164, which are pivotally connected to the driving arm 166 via the horizontal arm 162. This motion of the driving arm 166 and the parallel arms 164 results in a semicircular translational motion of the horizontal arm 162. That is, the horizontal arm 162 initially moves out, away from the spindle 124 and downwardly, from the retracted position shown in FIG. 1 through the partially deployed position shown in FIG. 2, and continues to move downward and indward from that position to the fully deployed position, shown in FIG. 3. Since the outer parallel arms 164 and the driving arm 166 are parallel to each other and have the same length, the horizontal arm 162 translates between the raised, stowed position and the lowered, deployed position, and does not rotate.

This motion of the four-bar linkage translates the probe assembly 117 to a position in which it is ready for inspection of a hole. That is, after a hole 109 has been drilled and the drilling spindle 124 and the drill bit 112 are retracted to the position shown in FIG. 1, a signal from the controller 116 causes the four-bar linkage of the deployment mechanism 122 to extend, as shown in FIGS. 2 and 3, and place the probe 118 between the drill bit 112 and one of the holes 109, as shown in FIG. 3. This places the probe 118 in alignment with the drilling axis 114 and adjacent to an opening in the pressure plate 104 and in position for insertion into the hole 109. With the probe 118 in this position, it is ready for insertion into the hole 109, as described in more detail below. After the hole 109 has been measured and the probe 118 has been removed from the hole, another signal from the controller 116 causes the pneumatic cylinder 128 to retract, thus reversing the above-described motion of the four bar linkage and causing the deployment mechanism 122 to retract, moving the probe assembly 117 and the probe 118 back to the stowed position, as shown in FIG. 3.

The deployment system 120 shown in FIGS. 1-3 includes a single deployment mechanism 122, bearing a single probe assembly. In another example, shown in FIGS. 4-6, a multiple-hole inspection system 210 can include a plurality of deployment mechanisms 222a-c. In this embodiment, each deployment mechanism 222a-c supports a unique probe assembly 217a-c, bearing a unique measuring probe 218a-c, respectively, each probe and probe assembly configured to measure a hole of a unique diameter. While the example shown in FIGS. 4-6 includes three probes 218 and three deployment mechanisms 222, a system in accordance with the present disclosure can have more than three or less than three probes and deployment mechanisms.

Like the example of FIGS. 1-3, the multiple hole inspection system 210 is associated with a robotic device 200 that is configured to drill a hole or holes 209 in a part or work piece 208. The robotic device 200 includes a drilling spindle 224 having a drill holder 201 that carries a drill bit 212, aligned along a drilling axis 214. The drilling spindle 224 is vertically moveable upon a slide 203, and the system also includes a pressure plate 204, clamp foot 202 and nose clamp support 206, which are elements similar to those disclosed above with respect to FIGS. 1-3. Those skilled in the art will appreciate that robotic devices, such as drilling machines, can be configured to automatically drill holes of varying diameters, such as by automatically interchanging bits. After the robotic device 200 automatically interchanges bits and drills a hole of a specified diameter, a controller 216 may responsively deploy one of the three automatic deployment mechanisms 222a-c, bearing one of the probe assemblies 217a-c and one of the probes 218a-c, respectively, with a diameter corresponding to that of the newly drilled hole.

Figure 4:
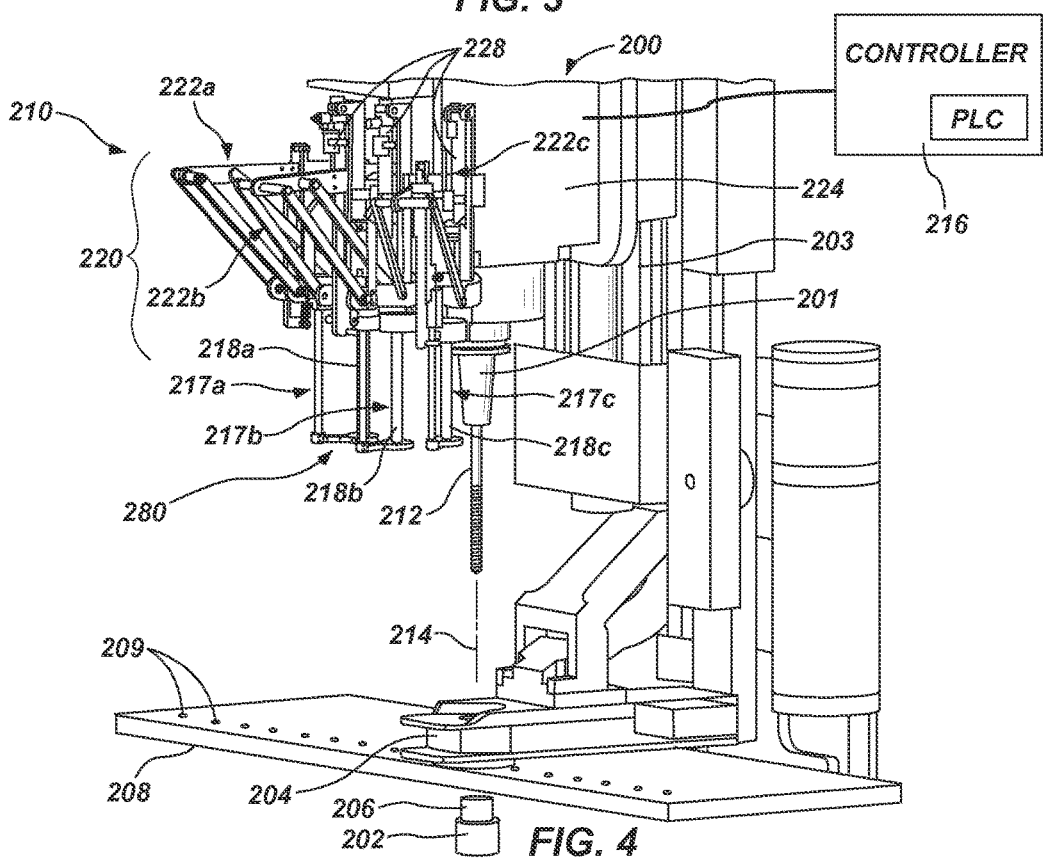
FIG. 4 is a perspective view of an example of drilling machine having a multiple hole inspection system in accordance with the present disclosure, showing the probe multiple probe deployment systems in the retracted or stowed position.
Figure 5:
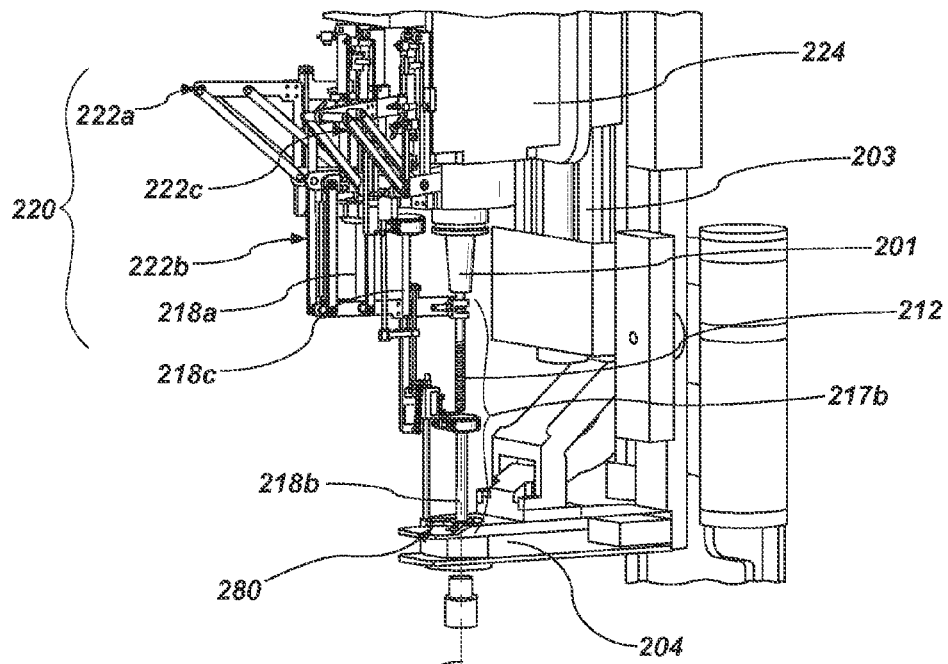
FIG. 5 is a perspective view of the multiple hole inspection system of FIG. 4, showing one of the three probe deployment systems in an extended or deployed position.
Figure 6:
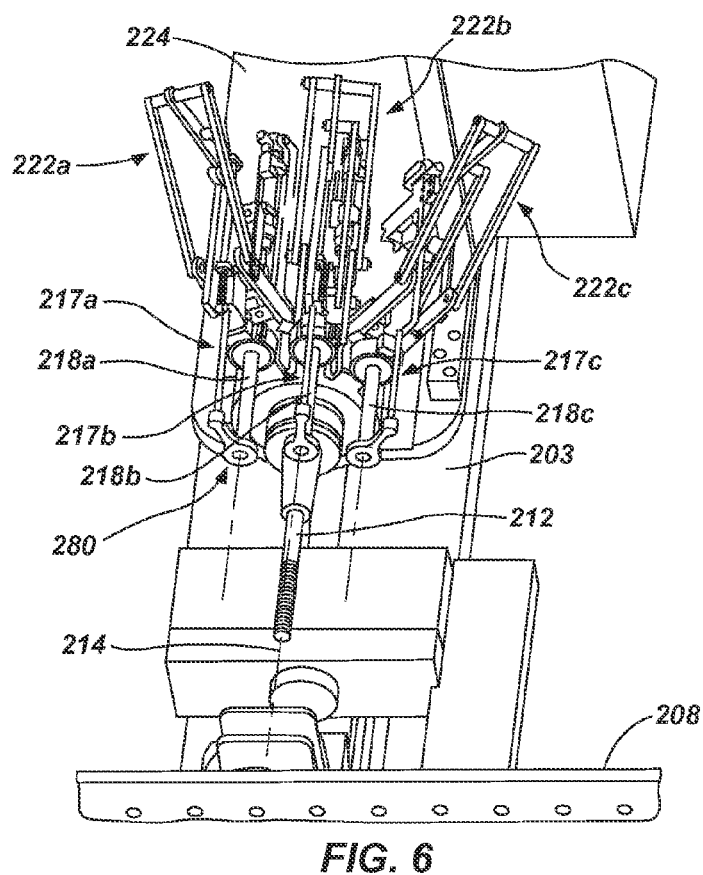
FIG. 6 is a bottom, perspective view of the multiple hole inspection of FIGS. 4 and 5, showing the radial alignment of the three probe deployment mechanisms in their retracted or stowed position.

Referring to FIGS. 4-6, it can be seen that the multiple-hole inspection system 210 also includes the controller 216 and probe-deployment systems 220, having pneumatic actuators 228 and three separate deployment mechanisms 222a-c, mounted to the drilling spindle 224 and supporting three measuring probe assemblies 217a-c, respectively. This system also includes a self-calibration system 280. The controller 216 is operatively coupled to the robotic device (drilling machine) 200, the probe assemblies 217a-c, and the probe-deployment systems 220, and is configured to selectively position any one of the measuring probes 218a-c for inspecting any of holes 209 formed in a work piece 208, and to receive signals from the probes. Each of the deployment mechanisms 222a-c can include a four-bar mechanism that operates in the manner of the four-bar linkage described above with respect to FIGS. 1-3. Motion of the four-bar linkage translates the selected probe assembly 217a-c to a position in which it is ready for inspection of a hole, and retracts it from that position after inspection, as described above.

The deployment mechanisms 222a-c are automatic and each has a stowed or retracted position, in which the probe assemblies 217a-c and probes 118a-c are positioned away from the drilling axis 214, and an extended or deployed position, in which the respective probe 118a-c is substantially axially aligned with the drilling axis 214. As illustrated in FIG. 4, the deployment mechanisms 222a-c are all in the stowed or retracted position. As shown in FIG. 5, one of the deployment mechanisms, specifically mechanism 222b, is extended, placing one of the probe assemblies, specifically assembly 218b, below the drill bit 212, so that the probe 218b is aligned with the hole (drilling) axis 214.

Where a multiple-hole inspection system 210 is associated with a single drilling machine or other robotic device 200, multiple probe deployment mechanisms 222 may be configured to move substantially radially relative to the hole (drilling) axis 214, as shown in the perspective bottom view of FIG. 6. That is, each deployment mechanism 220 holds its respective probe assembly 217a-c and probe 218a-c at a unique position when retracted, but translates the probe assembly 217a-c and probe 218a-c substantially along a radial path with respect to the hole (drilling) axis 214 during deployment, so as to place the probe along the hole axis 214 and below the bit 212 when in the deployed position. In the view of FIG. 6, the multiple probe deployment mechanisms 222 are shown in their retracted or stowed position.

Though not shown herein, drilling machines that simultaneously drill multiple holes with multiple spindles are also known, and aspects of the present disclosure are compatible with such machines. With such machines, one or more deployment mechanisms can be attachable to each spindle of the multiple spindle drilling machine, each deployment mechanism supporting a measuring probe of a unique diameter. The measuring probes can be used to substantially simultaneously automatically inspect multiple holes in the same way that the machine can drill multiple holes simultaneously.

Various additional features of the hole inspection system 110, shown in FIGS. 1-3, are illustrated and described with respect to FIGS. 7-15. It is to be appreciated, however, that similar elements are included in the embodiment of FIGS. 4-6, and those of skill in the art will recognize that the following discussion is equally applicable to that embodiment, except as modified for a multiple-hole inspection system. Referring, for example, to FIG. 1, the controller 116 is operatively coupled to the drilling machine 100, the hole-measuring probe 118, and the deployment system 120, and is configured to cause insertion of the probe 118 into the hole 109 substantially along the drilling axis 114, as discussed above, and removal of the probe 118 therefrom. The controller 116 is also configured to perform various numeric computations and logic operations based on the signals received from the measuring probe 118. The controller 116 can include the measurement-probe electronics (not shown) for generating a voltage signal. The magnitude of the voltage signal varies responsive to changes in capacitance, which depends, in part, on the spacing between the measuring probe 118 and the walls of the hole 109 being inspected.

The controller 116 may also include a programmable logic controller (PLC) 126, which is capable of converting the analog voltage signals from the probe 118 to digital signals, and performing logic operations and numeric computations with respect to those signals to produce the desired output—e.g. an indication of the diameter and profile of the hole 109. As used herein, the term "profile" refers to a geometric parameter which relates to the variation of the size and/or shape of a hole, e.g., the hole or aperture 109, relative to its depth, which is a design geometric parameter defined by the design specifications. The PLC 126 also receives signals from the robotic device 100 as to when to begin measuring hole diameters and when to self-calibrate. Though not shown, it is to be understood that the controller 116 can include input and output devices of various kinds (e.g. a keyboard, digital display, etc.) or it can be connected to an input/output device (e.g. a personal computer or the like) to allow interaction with and control by an operator.

The PLC 126 communicates to the robotic device 100 when the hole-measuring probe 118 is out of the hole 109. The PLC 126 also computes the diameter of the hole 109 from the signals received from the hole-measuring probe. The PLC then determines whether the diameter of the hole is within specification. If it is, the PLC 126 then signals to the robotic device 100 that the hole 109 is acceptable. If the diameter of the hole 109 is out of specification, then the PLC 126 signals to the robotic device 100 that the hole 109 is not acceptable. If the hole is acceptable, the robotic device 100 can proceed to drill another hole. If the hole 109 is out of specification, the PLC terminates the operation of the robotic device 100 and sends an error message, e.g. to the operator, so that the cause of the misdrilled hole can be investigated and resolved. Following correction of the error, the system can be reset and drilling can resume.

Figure 7:
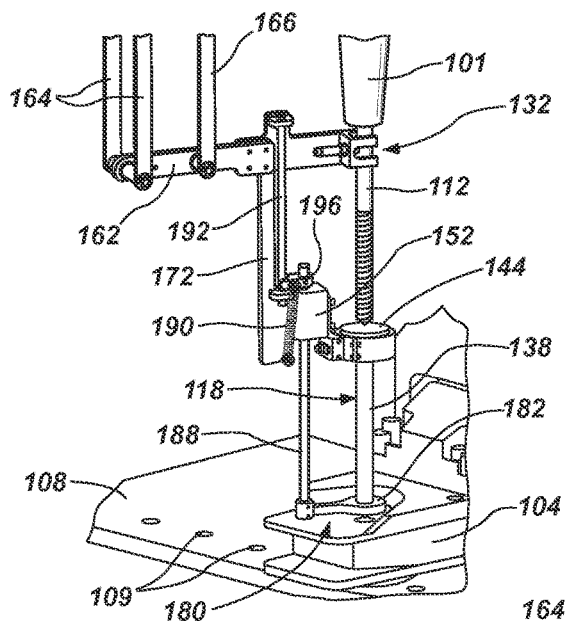
FIG. 7 is a perspective view of an automatic hole inspection system like that of FIGS. 1-3, showing the probe deployment in the fully deployed position, with the probe ready to be inserted.
Figure 8:
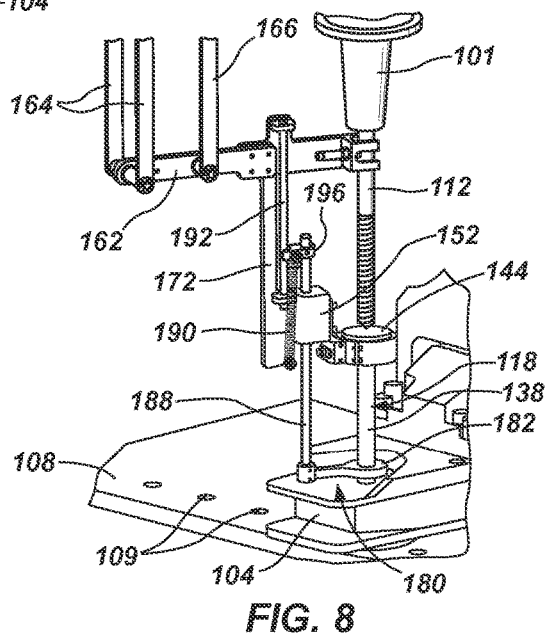
FIG. 8 is a perspective view of the system of FIG. 7, showing the probe inserted through the ring gage and partially inserted into the hole.
Figure 9:
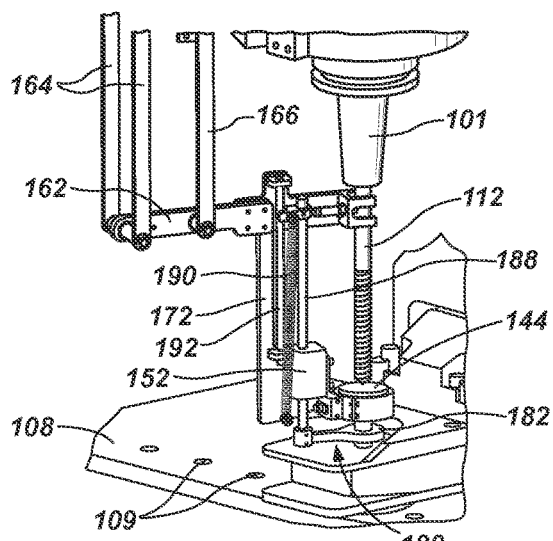
FIG. 9 is a perspective view of the system of FIGS. 7 and 8, showing the probe inserted through the ring gage and fully inserted into the hole.

With a probe assembly 117 and probe 118 in the deployed position, as shown in FIG. 3, a signal from the controller 116 (see FIG. 1) causes the drilling spindle 124 to move along the slide 103, causing the probe 118 to be inserted through the opening in the pressure plate 104 and into the hole 109 to allow measurement. FIGS. 7-9 illustrate this process. The probe assembly 117 (see FIG. 1) generally includes a vertical arm 172, a probe mount 152, to which the probe 118 is attached, a vertical guide shaft 192, a vertical ring gage shaft 188 that is parallel to the guide shaft 192, a self-calibration system 180, which includes a ring gage 182, and an extension spring 190. The vertical arm 172 is fixedly attached to the horizontal arm 162 of the deployment mechanism 122 (see FIG. 1), and the probe mount 152 is fixedly attached to the vertical arm 172. The vertical guide shaft 192 has a fixed position with respect to the vertical arm 172, and extends upward from the probe mount 152 to the upper region of the vertical arm 172.

Figure 14:
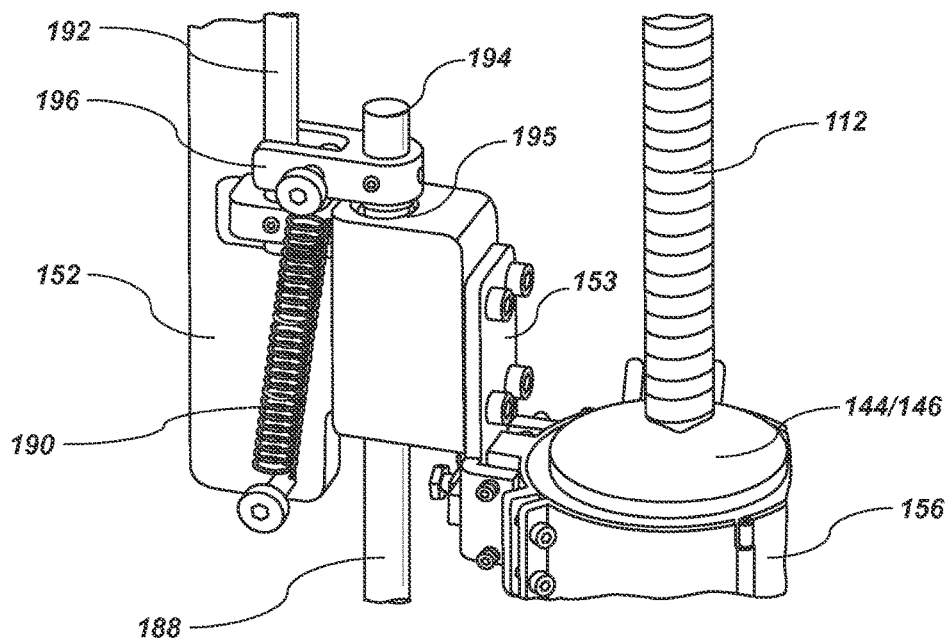
FIG. 14 is a perspective view showing parts of an example of the self-calibration system in accordance with the present disclosure.

A close-up view of the probe mount 152, guide shaft 192, extension spring 190, and ring gage shaft 188 is shown in FIG. 14. The ring gage shaft 188 is slidably disposed in a vertical aperture of the probe mount 152, and at its top end 194 the ring gage shaft 188 includes a guide mount 196 that slidingly engages the guide shaft 192. The extension spring 190 is attached between the probe mount 152 and the guide mount 196, which is coupled to the ring gage shaft 188. The spring 190 biases the self-calibration system 180 toward an extended position (see FIG. 7), in which the ring gage 182 is at the bottom of the probe 118. This is the ready position, in which the probe 118 and self-calibration system 180 are positioned for taking measurements.

In operation, the probe 118 and calibration system 180 are first deployed over the hole 109, as shown in FIG. 7. In this position the probe mount 152, guide shaft 192, ring gage shaft 188, and the proximal end 144 of the probe 118 are in the position shown in FIG. 14. From this point, the drill spindle 124 (FIG. 1) lowers the probe 118 through the ring gage 182, through an opening in the pressure plate 104, and into the hole 109 in the part or work piece 108. FIG. 8 shows a midway point in this motion. As the probe 118 is being inserted through the pressure plate 104, into the hole 109, the ring gage 182 is gradually pushed up along the shaft 138 of the probe 118 by the pressure plate 104. At the same time, the guide mount 196 on the ring gage shaft 188 slides up along the guide shaft 192 against the tension of the extension spring 190, as shown in FIG. 8. When the probe 118 is fully inserted, as shown in FIG. 9, the guide mount 196 will be extended toward the top of the guide shaft 192, the extension spring 190 will be fully extended, and the ring gage 182 will be pushed toward the top of the probe 118 a distance which depends on the depth of the hole 109. The ring gage 182, probe mount 152, and other nearby structures in this orientation are shown in more detail in the close-up view of FIG. 15. When the probe 118 is withdrawn from the hole 109, the process reverses, and the spring 190 will pull the ring gage 182 back down to the ready position, as shown in FIG. 7.

Figure 10:
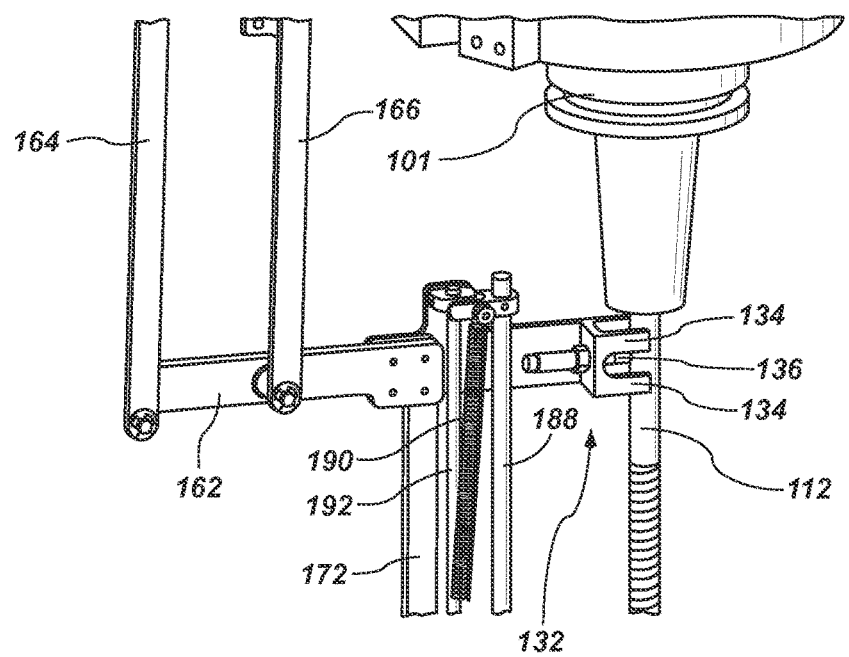
FIG. 10 is a perspective view of an example of a centering stop in accordance with the present disclosure.

As shown in FIG. 10, a centering device 132 can be attached to the horizontal arm 162 of the deployment mechanism 122 (FIG. 1). It is desirable that the probe 118 be centered in the hole 109 so that it measures hole diameter accurately. The centering device 132 is configured to contact the drill bit 112 (or a shaft that is concentric with the drill bit 112) when the deployment mechanism 122 is in the extended position, as shown in, e.g., FIGS. 3 and 7, to ensure axial alignment of the probe 118 with the drill bit 112. The centering device 132 includes a shock absorber stop 136, which is configured to contact the drill bit 112 to align the probe 118 with the drill-bit axis. The centering device 132 has tapered arms 134 that are tapered outward, so as to slide on the shank of the drill bit 112 and symmetrically guide the bit until the shank contacts the shock absorber stop 136 and is centered in the centering device 132. The tapered arms 134 define a V-shape, which helps center the probe 118 relative to the drill bit 112. This configuration of the centering device promotes consistent centering of the probe 118 along the drill axis 114. FIG. 3 shows the centering device 132 and the probe 118 in alignment with the drill bit 112. In this position, the probe 118 is ready to pass through the opening in the pressure plate 104 and into the hole 109, as the drill spindle 124 is translated toward the work piece 108.

Figure 11:
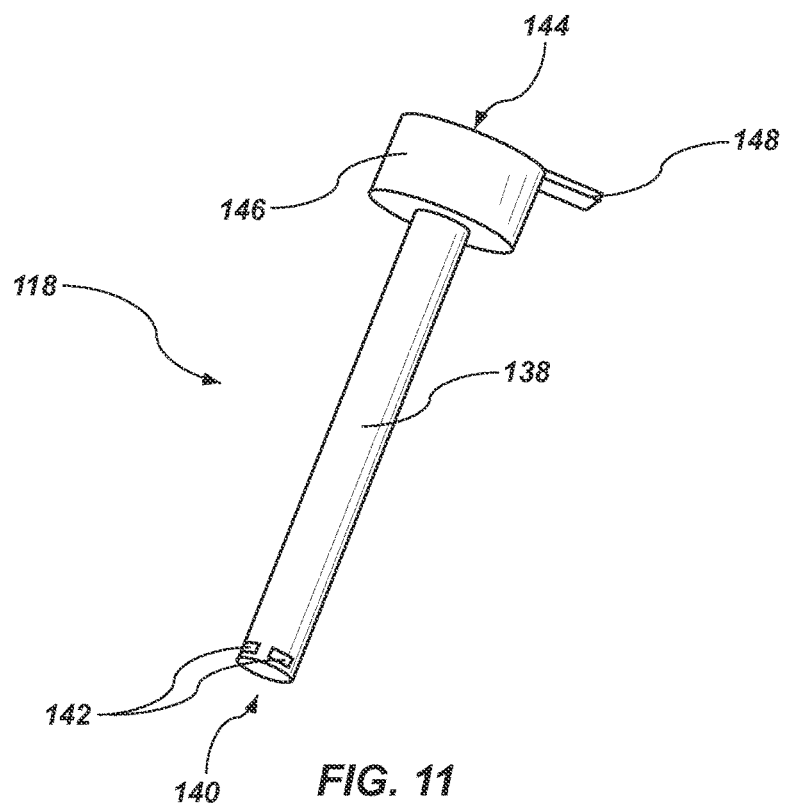
FIG. 11 is a perspective view of an example of a capacitance-type probe that is suitable for use with the hole inspection system disclosed herein.

The probe 118 can be, e.g., a capacitance-type probe, configured to provide signals that vary according to the diameter of the hole 109. For capacitance detection, it is desirable that the material of the work piece 108 be an electrically conductive material. One example of a probe 118 that is suitable for use with the hole inspection system 110 disclosed herein is shown in FIG. 11. In this embodiment, the probe 118 comprises an elongate shaft 138, having a distal end 140, with a plurality of capacitor plates 142 disposed around a perimeter of the shaft 138 at the distal end 140. The proximal end 144 of the probe 118 includes a probe housing 146. Electrical leads 148 of the probe 118 extend from the probe housing 146 to the controller 116 (FIG. 1) and provide a signal from the capacitor plates 142. The signal varies with the diameter of the hole 109 (FIG. 1) and the can also vary depending on the alignment or profile of the hole 109.

Figure 12:
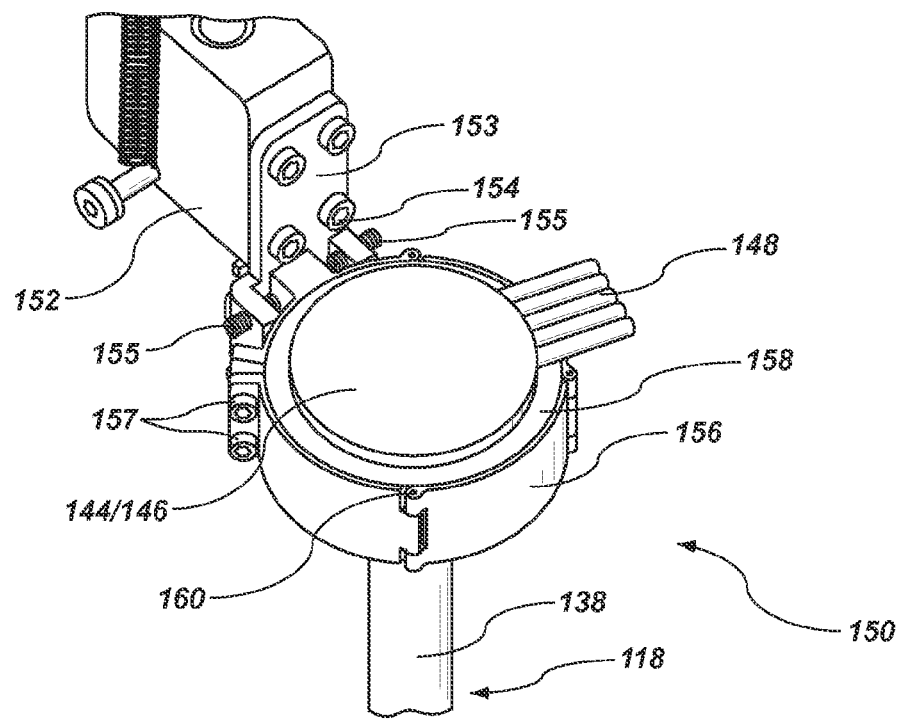
FIG. 12 is a perspective view of an example of a probe mount in accordance with the present disclosure.

As shown in FIG. 12, the housing 146 of the probe 118 is retained within a tube clamp 150 that is attached to the probe mount 152 by a bracket 153 and screws 154. The tube clamp 150 can be a ring 156, with e.g. four segments, encircling a spacer 158, such as a closed-cell foam material, disposed inside the ring 156 to help retain the probe housing 146 therein. While a four-segment ring 156 is shown, it is to be appreciated that a different number of segments can be provided, and other types of devices that perform the function of the tube clamp 150 can also be used. For example, a clamp with three segments or more than four segments can also be used and provide firm support for the probe housing 146.

The probe mount 152 also includes centering screws 155, which are provided to make centering adjustments during the initial probe set up. These screws allow the lateral position of the tube clamp 150 to be adjusted to place the center of the probe housing 146 in line with the hole (drilling) axis (114 in FIGS. 1-3). The configuration of the probe mount 152, shown in FIG. 12, thus provides a compliant clamping system in which the spacer 158, which is compliant or deformable, is sandwiched within the segmented ring 156. Each segment of the ring 156 is pinned to the adjacent ring segments with a small-diameter roll pin 160. The ring 156 includes a pair of clamp screws 157, which draw the segments of the ring together to generate the clamping force. Adjustment of the clamp screws 157 allows the degree of clamping to be adjusted. The four-segment tube clamp 150 thus clamps the foam 158 with even pressure, and this maintains concentric positioning between the probe housing 146 and the ring 156. Other types of clamps can also be used, but some types of clamps, e.g. commercially available hose clamps, are believed to present a greater likelihood of applying pressure unevenly to the probe housing 146, and, accordingly, may not provide the desired concentricity of the probe 118 and clamp 150.

As the measuring probe 118 is inserted into the hole 109 (or while being retracted therefrom), the controller 116 causes the probe 118 to take capacitance readings at one or more positions within the hole (e.g. at one or more positions relative to the depth of the hole). In one example, the system is configured to take capacitance readings at four different depths along the hole. Since the probe includes multiple capacitor plates 142, each having a unique angular orientation relative to the distal end 140 of the probe 118, each capacitance reading of the probe will include multiple signals, each corresponding to one capacitor plate 142.

The probe shaft 138 has a diameter that is slightly smaller than the diameter of the hole 109. Consequently, there will normally be an air gap between each capacitor plate 142 and the adjacent sidewall of the hole 109. The air gap between a given capacitor plate and the adjacent sidewall of the hole may vary depending on the diameter of the hole and any irregularities of the hole—e.g. out-of-round, misaligned, etc. The larger the gap between a given capacitor plate and the adjacent sidewall of the hole, the lower the capacitance. The controller 116 can be programmed to recognize these variations and determine whether the hole is outside of the design specification.

Similarly, variations in the profile of the hole 109 can also be determined using the capacitance readings of the probe 118. When capacitance readings are taken at several discrete depths during insertion of the probe 118 into the hole, changes in these readings can indicate that the shape and/or diameter of the hole varies with depth, which indicates that profile of the hole is out of specification. Variations in the alignment of the hole 109 can also be determined in this way. Where capacitance readings are taken at different depths during insertion of the probe 118 into the hole, and these readings gradually increase on one side of the probe and decrease on the opposite side of the probe, this can indicate that the alignment of the hole is out of specification. The controller 116 can be configured to receive and interpret the capacitance signals to perform profile and alignment measurement, as well as diameter measurements of the hole or holes being monitored.

Figure 13:
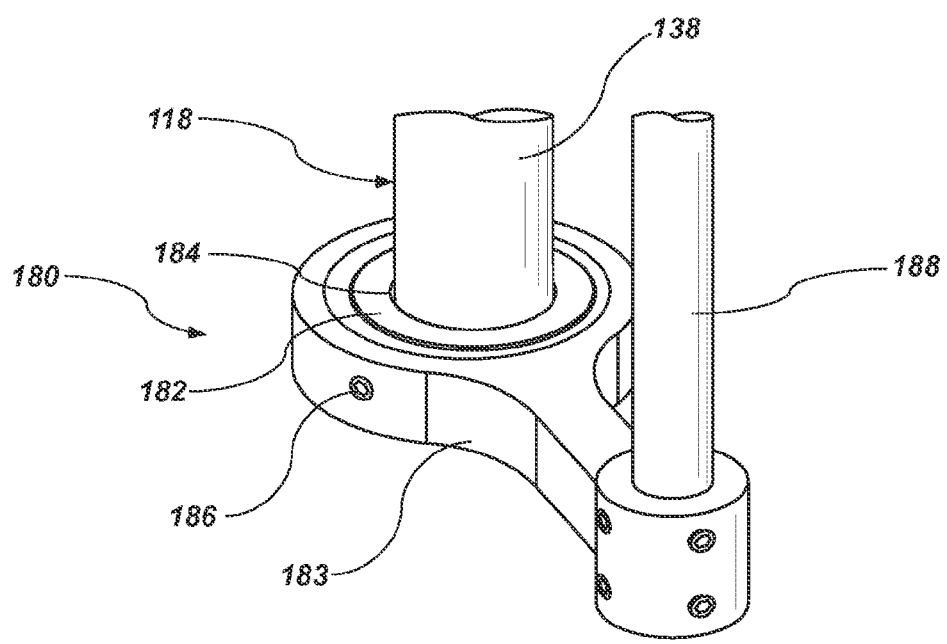
FIG. 13 is a perspective view of an example of a ring gage and ring gage mount in accordance with the present disclosure.
Figure 15:
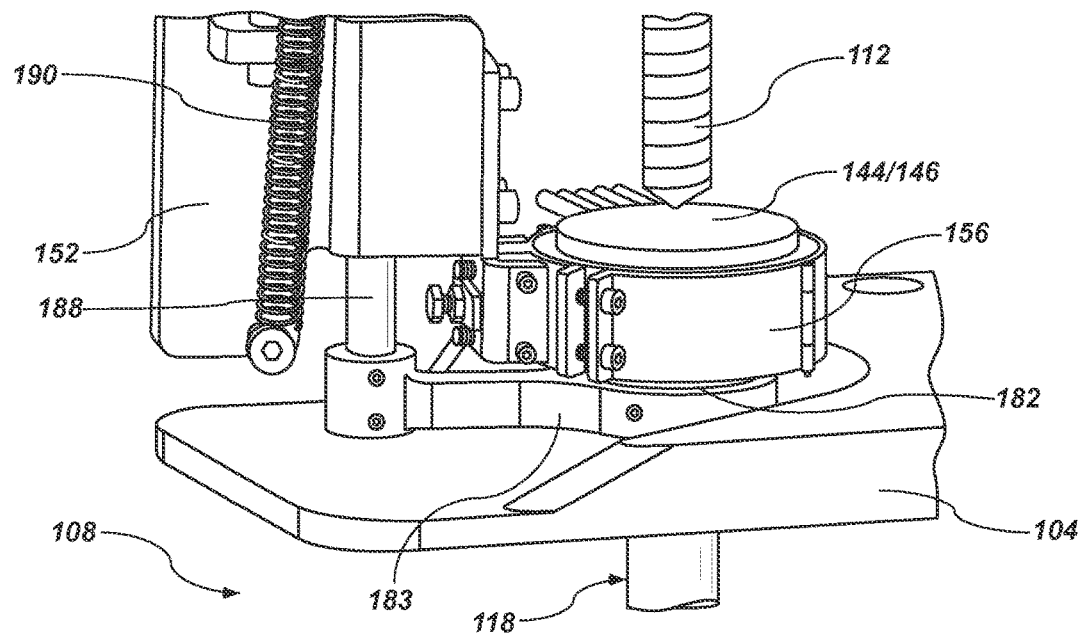
FIG. 15 is a perspective view of an example of the ring gage pushed up by the pressure plate, in accordance with the present disclosure.

As noted above, the hole inspection system 110 can also include a self-calibration system 180, shown in more detail in FIGS. 13-15. The self-calibration system 180 includes the ring gage 182, attached to the probe assembly 117 via a ring gage mount 183, which is attached to the ring gage shaft 188. Viewing FIG. 13, the ring gage 182 has a central aperture 184 of a known diameter, corresponding to a design diameter of the hole 109. The ring gage mount 183 maintains concentricity of the ring gage 182 with the shaft 138 of the probe 118. Threaded adjusters, e.g., three set screws 186 (only one of which is shown in FIG. 13), are used to adjust the position of the ring gage 182 relative to the ring-gage mount 183, so as to center the ring-gage aperture 184 with respect to the probe 118. The set screws 186 may be substantially equally spaced around the ring gage mount 183. With reference to FIGS. 9 and 14, the guide shaft 192 works in conjunction with the ring gage shaft 188 and has several basic functions. First, it guides the ring gage shaft 188 when the ring gage mount 183 is pushed up the probe shaft 138. It also maintains the ring gage 182 in a horizontal position relative to the probe 118. The guide mount 196 can also include a seat 195 so that the ring gage mount 183 is stopped at the same height location each time.

With reference to FIGS. 7-9, 13, and 15, the probe 118 is configured to pass through the ring gage 182 prior to being inserted into the hole 109 to measure a reference signal (which may include a plurality of signals), indicative of the difference between the inner diameter of the central aperture 184 of the ring gage 182 and the outer diameter of the shaft 138 of the probe 118. To ensure the needed measurement accuracy, the controller 116 uses the reference signal to calibrate the subsequent measurement signal (which may include a plurality of signals) from the probe 118. That is, the controller 116 uses the reference signal as a standard with which to compare the signals obtained during measurements of the hole. A measurement signal that is greater or less than the reference signal indicates that the capacitance plate that produced that signal is, respectively, closer to or farther away from the sidewall of the hole being measured than to or from the side wall of the aperture 184 of the ring gauge 182. When the signals from all capacitance plates are analyzed together in this way, this allows the system to determine whether the hole diameter is smaller or larger than the aperture 184 of the ring gage 182, and whether and how much the hole deviates from the design profile.

The discussion herein is presented in the context of a system for inspecting drilled holes. However, it is to be appreciated that the principles and apparatus disclosed herein can also be adapted to holes or apertures created by processes other than drilling, and can also apply to holes or apertures that are not circular. For example, holes or apertures that have been produced through casting or cutting in various ways can also be inspected. Additionally, elongate slots, such as those produced by a milling machine, can also be inspected using this system and method. In such case, the probe can be inserted at one end of the slot, and then the work piece can be moved so that the probe travels along the slot. The probe can also be moved vertically at various locations along the slot, if desired, to take measurements at various vertical positions in the slot.

Non-circular probes can also be used for inspecting non-circular apertures. For example, probes having a rectangular, triangular, or elliptical cross-section can be provided for inspecting rectangular, triangular or elliptical apertures, respectively. Accordingly, the terms "hole" and "drill" as used herein are to be interpreted broadly as referring to any aperture produced by any method.

Likewise, the system disclosed herein is not limited to measuring or inspecting diameter, and the term "diameter" should be recognized as representing a geometric parameter, such as a parameter relating generally to the "size" aspect of a hole or aperture and/or to additional geometric aspects thereof. For example, the system and method disclosed herein can be used to detect out-of-round holes and oblique holes. Where a hole is out-of-round, there will be a greater gap between the capacitor plates and the sidewalls of the hole on one side of the probe than on the other. This variation in the gap will produce capacitance readings that vary accordingly and can be identified. Obliqueness refers to the angle of the hole or aperture with respect to the surface in which it is made. Where a hole is intended to be perpendicular to a surface, for example, variation in the angle of the hole from the design angle will produce capacitance readings that vary accordingly and can be identified. Likewise, the system and method disclosed herein can be used to inspect the axial alignment of a hole. If a hole, as-produced, is misaligned with respect to its longitudinal centerline (central axis), as defined by the design specifications, the gaps between the capacitor plates and the sidewalls of the hole will vary with depth of insertion of the probe into the hole, and will produce changing capacitance readings during insertion and/or removal of the probe from the hole. The location and magnitude of these variations in measured capacitance can be identified and interpreted to show the magnitude and direction of variation of the alignment of the hole.

Figure 16:
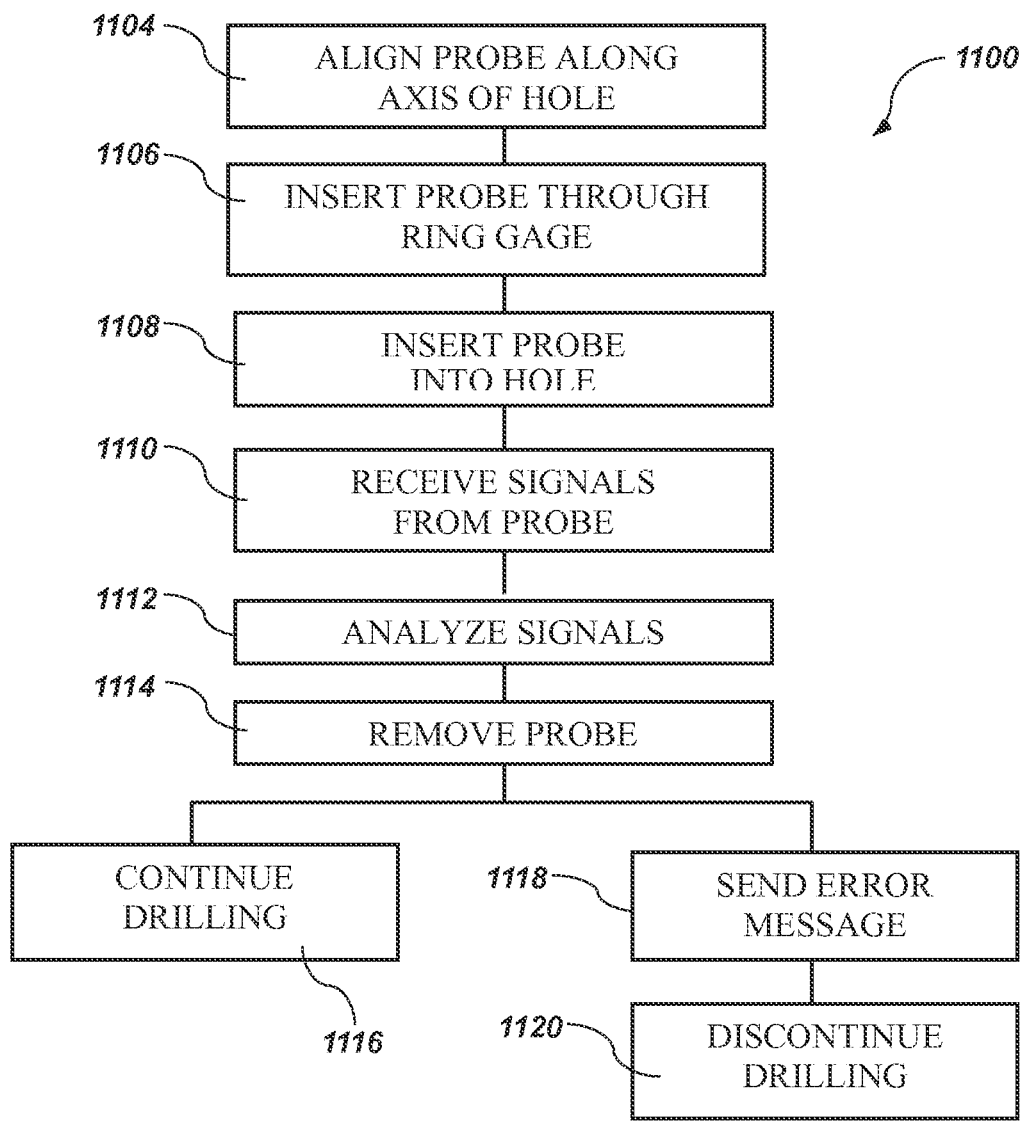
FIG. 16 is a flowchart outlining an example of a method for inspecting a drilled hole in accordance with the present disclosure.

FIG. 16 is a flowchart outlining an exemplary method for inspecting a hole or aperture in accordance with the present disclosure. Those of skill in the art will recognize that the number of steps and the order of steps in the method disclosed herein can vary in some respects from what is shown this figure. A method 1100 for inspecting, e.g., a drilled hole, as disclosed herein, generally includes first aligning a measurement probe substantially along (so its axis substantially collinear with) an axis of a hole drilled by a drilling machine (block 1104). As discussed above, this can be accomplished via an automatic deployment mechanism, such as a parallel arm device, actuated by a pneumatic cylinder. If a calibration ring gage is used, the method can then include inserting the probe through the ring gage (block 1106) and then inserting the probe into the hole (block 1108). Insertion and removal of the probe can be accomplished by automatically moving the drilling machine along the axis of the hole, as discussed above. The ring gage can have a diameter that corresponds to a design diameter of the hole, and inserting the probe through the ring gage can occur generally concurrently with inserting the probe into the hole.

After or as the probe is inserted through the ring gage and into the hole, one or more readings are taken, and corresponding signals are sent to and received by the controller (block 1110). This step can include receiving signals from the probe at multiple positions relative to a depth of the hole during the insertion and/or removal of the probe. In one example, signals from the probe are received from at least four positions relative to the depth of the hole during the insertion and/or removal of the probe. These signals are analyzed for compliance with specifications for the hole e.g. diameter and profile, which can include comparing the signals from the hole with corresponding signals during insertion through the ring gage (block 1112). Specifically, the signal from the probe can include a reference signal indicative of the diameter or size of the ring gage (which corresponds to a design geometric parameter of the aperture to be inspected), and analyzing the signals can include comparing the measurement signal with the reference signal. The probe can then be removed from the hole and the ring gage (block 1114).

Depending on the signals that were received during insertion of the probe through the ring gage and into the hole, two possible outcomes are possible: either the hole complies with its specifications, or it does not. If the hole complies, the system can continue drilling the next hole (block 1116). However, if the hole does not meet specifications, the controller can send an error message indicating the non-compliance (block 1118), and cause the system to discontinue drilling (block 1120) until a worker resets the system or takes other action.

It will be apparent that the method shown in FIG. 16 can be repeated for multiple holes, and can also be performed substantially simultaneously on multiple holes with drilling machines that simultaneously drill multiple holes with multiple spindles. Specifically, the method can include placing a second hole diameter probe substantially along (so that its axis is substantially collinear with) an axis of a second hole drilled by the drilling machine (e.g. via a second automatic deployment mechanism), then inserting the second probe into the second hole and removing it therefrom by automatically moving the drilling machine along the axis of the second hole, receiving signals from the second probe at multiple positions relative to a depth of the second hole during the insertion and/or removal of the second probe, and analyzing those signals. Insertion and removal of the second probe can occur substantially concurrently with insertion and removal of the first probe in the first hole.

As noted above, a single drilling machine can be configured to drill holes of varying diameters e.g. by automatically interchanging bits. In this case, the step of placing the hole measurement probe substantially along (so that its axis is substantially collinear with) the longitudinal centerline of the hole can include selecting the automatic deployment mechanism from among a plurality of automatic deployment mechanisms, and extending the automatic deployment mechanism to place the supported probe substantially along the centerline of the hole. Thereafter, the method proceeds as outlined in FIG. 16. Signals from the probe are received and analyzed, and the controller sends signals to the drilling system to either continue or discontinue drilling.

Figure 17:
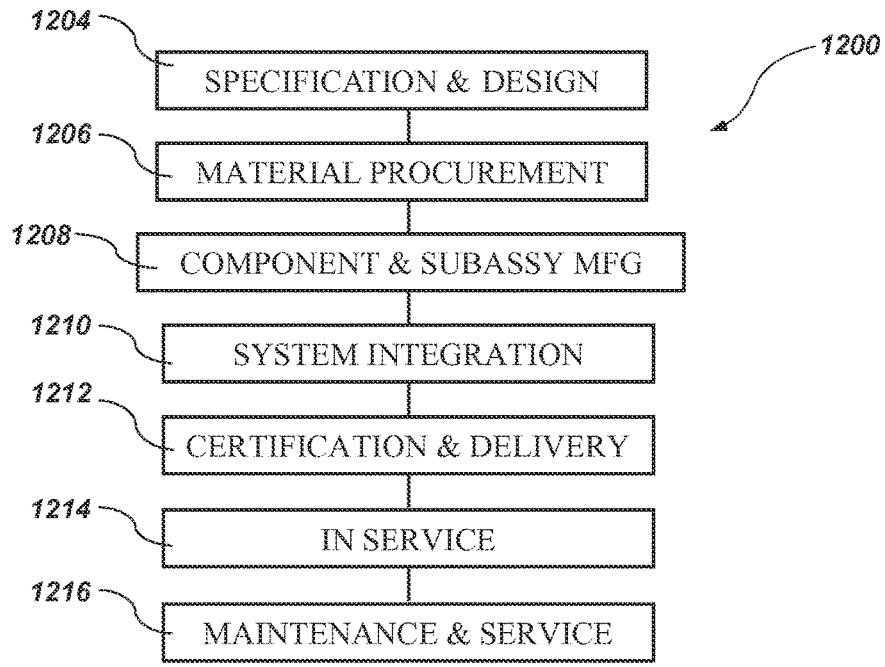
FIG. 17 is a flowchart outlining an example of an aircraft manufacturing and service method.
Figure 18:
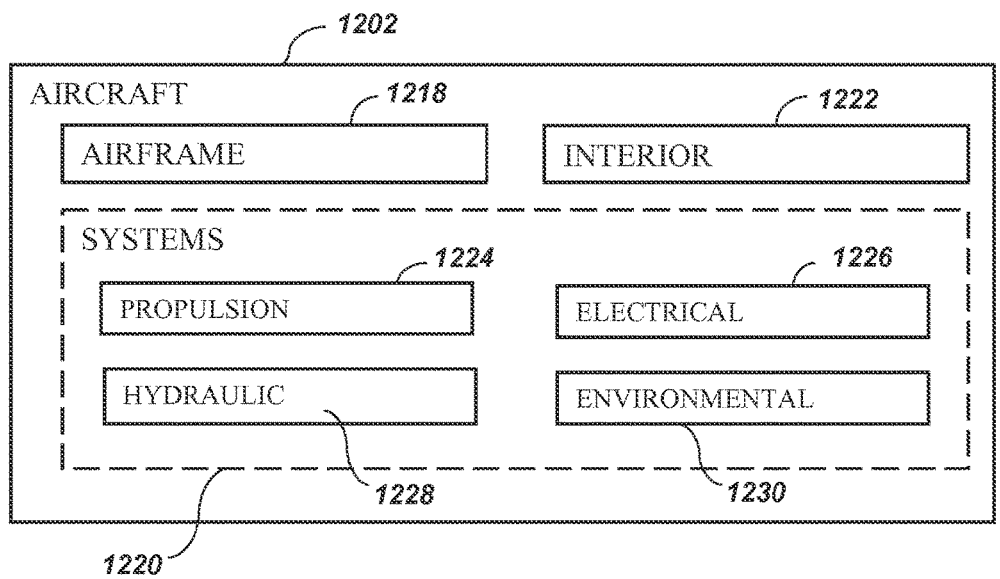
FIG. 18 is a block diagram of an aircraft.

Aspects of the disclosure may be described in the context of an aircraft manufacturing and service method 1200 as shown in FIG. 17 and an aircraft 1202 as shown in FIG. 18. During pre-production, exemplary method 1200 may include specification and design 1204 of the aircraft 1202 and material procurement 1206. During production, component and subassembly manufacturing 1208 and system integration 1210 of the aircraft 1202 takes place. Thereafter, the aircraft 1202 may go through certification and delivery 1212 in order to be placed in service 1214. While in service by a customer, the aircraft 1202 is scheduled for routine maintenance and service 1216 which may also include modification, reconfiguration, refurbishment, and so on.

Each of the processes of method 1200 may be performed or carried out by a system integrator, a third party, and/or an operator e.g., a customer. For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 18, the aircraft 1202 produced by exemplary method 1200 may include an airframe 1218 with a plurality of systems 1220 and an interior 1222. Examples of high-level systems 1220 include one or more of a propulsion system 1224, an electrical system 1226, a hydraulic system 1228, and an environmental system 1230. Any number of other systems may be included. Although an aerospace example is shown, the principles of the invention may be applied to other industries, such as the automotive industry.

Apparatus and methods embodied herein may be employed during any one or more of the stages of the production and service method 1200. For example, components or subassemblies corresponding to production process 1208 may be fabricated or manufactured in a manner similar to components or subassemblies produced while the aircraft 1202 is in service. Also, one or more apparatus embodiments, method embodiments, or a combination thereof may be utilized during the production stages 1208 and 1210, for example, by substantially expediting assembly of or reducing the cost of an aircraft 1202. Similarly, one or more of apparatus embodiments, method embodiments, or a combination thereof may be utilized while the aircraft 1202 is in service, for example and without limitation, to maintenance and service 1216.

It is to be understood that the above-referenced arrangements are exemplary illustrations of the various aspects of the present disclosure. It will be apparent to those skilled in the art that numerous modifications of one or more of the disclosed examples can be made without departing from the principles and concepts of the present disclosure and the appended claims.

What is claimed is:

1. A drilling system, comprising:
   a drilling machine, configured to drill a hole in a work piece along a drilling axis;
   a deployment mechanism, attached to the drilling machine;
   a measuring probe, attached to the deployment mechanism and configured to produce a signal indicative of an actual geometric parameter of the hole when inserted therein, the deployment mechanism being configured to selectively align the measuring probe along the drilling axis;
   a controller, coupled to the drilling machine, the measuring probe, and the deployment mechanism, the controller configured to cause insertion of the measuring probe into the hole, and to receive the signal from the measuring probe; and
   a self-calibration system having a ring gage, attached to the deployment mechanism, having a known shape corresponding to a design geometric parameter of the hole, wherein the measuring probe passes through the ring gage when inserted into the hole to produce a reference signal indicative of the design geometric parameter.

2. A drilling system in accordance with claim 1, wherein the drilling machine comprises a robotic or N/C drilling machine.

3. A drilling system in accordance with claim 1, wherein the measuring probe is a capacitance-type probe.

4. A drilling system in accordance with claim 1, wherein the measuring probe is configured to provide the signal corresponding to the actual geometric parameter at one or more positions relative to a depth of the hole.

5. A drilling system in accordance with claim 4, wherein the measuring probe comprises:

an elongate body, having a distal end; and
a plurality of capacitance plates disposed around a perimeter of the body at the distal end, a measurement signal of the plurality of capacitance plates varying with a variation of the actual geometric parameter of the hole along the depth of the hole.

6. A drilling system in accordance with claim 1, wherein the deployment mechanism comprises:
a parallel arm device, configured to translate the measuring probe between a stowed position offset from the drilling axis, and an extended position below and axially aligned with a drill bit of the drilling machine; and
a centering device attached to the parallel arm device, wherein the centering device indexes to an axis concentric with the drill bit when the deployment mechanism is in the extended position to provide axial alignment of the probe with the drill bit.

7. A drilling system in accordance with claim 1, further comprising:
a machining bit, attached to the drilling machine and aligned with the drilling axis; and wherein
the deployment mechanism comprises a mechanical linkage, supporting the measuring probe, configured to selectively orient the measuring probe along the drilling axis, the deployment mechanism having a stowed position in which the measuring probe is positioned laterally away from the drilling axis, and an extended position in which the measuring probe is positioned below the machining bit and axially aligned with the drilling axis, the mechanical linkage configured to move the measuring probe via translation between the stowed and extended positions.

8. A drilling system in accordance with claim 1, further comprising a plurality of deployment mechanisms attached to the drilling machine, each deployment mechanism supporting an additional measuring probe.

9. A drilling system in accordance with claim 8, further comprising:
a plurality of automatically interchangeable machining bits associated with the drilling machine, each automatically interchangeable machining bit having a unique drilling characteristic; and wherein
each additional measuring probe has a measurement characteristic corresponding to the unique drilling characteristic of a selected one of the automatically interchangeable machining bits.

10. A drilling system in accordance with claim 1, wherein the actual geometric parameter is selected from the group consisting of hole diameter, hole alignment, hole obliqueness and hole profile.

11. A drilling system, comprising:
a drilling machine, having a first machining bit selectively aligned with a drilling axis, configured to drill a hole in a work piece along the drilling axis, the hole having a design geometric parameter selected from the group consisting of hole diameter, hole alignment, hole obliqueness and hole profile;
a first measuring probe, configured to produce a signal indicative of an actual geometric parameter of the hole when inserted therein;
a first deployment mechanism, attached to the drilling machine and supporting the first measuring probe, having a stowed position in which the first measuring probe is positioned laterally away from the drilling axis, and an extended position in which the first measuring probe is positioned via a translational motion below the first machining bit and aligned with the drilling axis; and
a controller, coupled to the drilling machine, the first measuring probe, and the first deployment mechanism, configured to cause insertion of the first measuring probe into the hole, and to receive the signal from the first measuring probe.

12. A drilling system in accordance with claim 11, further comprising a self-calibration system, comprising:
a ring gage, attached to the first deployment mechanism, having a known shape corresponding to a design geometric parameter of the hole, wherein the measuring probe is configured to pass through the ring gage when inserted into the hole to produce a reference signal indicative of the design geometric parameter.

13. A drilling system in accordance with claim 11, wherein the first deployment mechanism comprises:
a parallel arm device, configured to translate the measuring probe between the stowed position and the extended position; and
a centering device attached to the parallel arm device, wherein the centering device indexes to an axis concentric with the machining bit when the deployment mechanism is in the extended position, to provide axial alignment of the probe with the machining bit.

14. A drilling system in accordance with claim 11, wherein the measuring probe is configured to provide a signal corresponding to the actual geometric parameter at one or more positions relative to a depth of the hole.

15. A drilling system in accordance with claim 11, wherein the measuring probe is a capacitance-type probe comprising:
an elongate body, having a distal end; and
a plurality of capacitance plates disposed around a perimeter of the body at the distal end, a capacitance signal of the plurality of capacitance plates varying with a variation of the actual geometric parameter of the hole along a depth of the hole.

16. A drilling system in accordance with claim 11, further comprising:
a plurality of automatically interchangeable machining bits associated with the drilling machine, each automatically interchangeable machining bit having a unique drilling characteristic;
a plurality of deployment mechanisms attached to the drilling machine;
an additional measuring probe supported by each deployment mechanism, each additional measuring probe having a measurement characteristic corresponding to the unique drilling characteristic of a selected one of the automatically interchangeable machining bits, each deployment mechanism having a stowed position in which the respective measuring probe is positioned laterally away from the drilling axis, and an extended position in which the respective measuring probe is positioned via a translational motion below the selected one of the machining bits and aligned with the drilling axis; and
wherein the controller is coupled to each measuring probe and each deployment mechanism, and is configured to cause insertion of a respective measuring probe into the hole, and to receive the signal from the respective measuring probe.

17. A drilling and inspection system, comprising:
- a robotically-controlled drilling machine, configured to drill a hole in a work piece along a drilling axis, the hole having a design geometric parameter;
- a deployment mechanism, attached to the drilling machine;
- a measuring probe, attached to the deployment mechanism and configured to produce a signal indicative of an actual geometric parameter of the hole when inserted therein, the deployment mechanism having a stowed position in which the measuring probe is positioned laterally away from the drilling axis, and an extended position in which the measuring probe is positioned via a translational motion in alignment with the drilling axis;
- a ring gage, attached to the deployment mechanism and disposed below the measuring probe, having a known shape corresponding to the design geometric parameter, wherein the measuring probe passes through the ring gage when inserted into the hole to produce a reference signal indicative of the design geometric parameter; and
- a controller, coupled to the drilling machine, the measuring probe, and the deployment mechanism, the controller configured to cause insertion of the measuring probe into the hole, and to receive the signal from the measuring probe and compare the actual geometric parameter to the design geometric parameter.

18. A drilling and inspection system in accordance with claim 17, further comprising a centering device, attached to the deployment mechanism, configured to index the measuring probe to the drilling axis when the deployment mechanism is in the extended position, to provide axial alignment of the measuring probe with the drilling axis.

* * * * *